United States Patent [19]

Galloway

[11] Patent Number: 5,582,800
[45] Date of Patent: Dec. 10, 1996

[54] METHOD AND SYSTEM FOR REMOVAL OF HARMFUL HETEROATOMS IN GASEOUS WASTE STREAMS

[75] Inventor: Terry R. Galloway, Berkeley, Calif.

[73] Assignee: Scientific Ecology Group, Oak Ridge, Tenn.

[21] Appl. No.: 365,351

[22] Filed: Dec. 28, 1994

[51] Int. Cl.$^6$ .................................. A62B 7/08; B01J 8/04
[52] U.S. Cl. ......................... 422/125; 422/171; 422/189; 588/247
[58] Field of Search .................................. 422/121, 122, 422/125, 171, 189; 588/247; 110/346; 208/49, 74; 423/245.2, 248, 247

[56] References Cited

U.S. PATENT DOCUMENTS

| | | | |
|---|---|---|---|
| 4,416,767 | 11/1983 | Jordan | 208/262 |
| 4,688,495 | 8/1987 | Galloway | 422/189 |
| 4,863,702 | 9/1989 | Galloway et al. | 422/189 |
| 4,874,587 | 10/1989 | Galloway | 422/189 |
| 5,245,113 | 9/1993 | Schulz | 588/209 |
| 5,260,047 | 11/1993 | Berger | 423/245.1 |
| 5,335,609 | 8/1994 | Nelson et al. | 110/346 |
| 5,370,715 | 12/1994 | Kortzeborn et al. | 48/197 R |
| 5,427,738 | 6/1995 | Galloway | 422/26 |

OTHER PUBLICATIONS

R. Yildirim and S. M. Senkan, "Pyrolysis and Oxidative Pyrolysis of Methyl Chloride in Steam," Ind. Eng. Chem. Res. 32, pp. 438–444 (1993).
Federal Register No. 57, Aug. 25, 1992, pp. 38558–38564,
EPA Memorandum Sep. 30, 1991 from Sylvia Lowrence, Dir., Solid Waste to Allyn M. Davis, Dir., Region 6.
A. Granada, S. M. Karra, S. M. Senkan, "Conversion of CH$_4$ into C$_2$H$_4$ by the Chlorine Catalyzed Oxidative–Pyrolysis (CCOP) Process 1. Oxidative Pyrolysis of CH$_3$Cl," Ind. Eng. Chem. Res. 26, pp. 1901–1905 (1987).
S. M. Senkan, R. Yildirim, D. Palke, G. E. Lewis, "Conversion of Methane to Ethylene and Acetylene by Chlorine-Catalysed Oxidative Pyrolysis Process," in *Novel Production Methods for Ethylene, Light Hydrocarbons and Aromatics*, L. F. Albright, B. L. Crynes, S. Nowak, Eds.; Marcel Dekker: New York, NY, 1992.
S. M. Senkan, Ramazan Yildirim, "Formation of High Molecular Weight Byproducts During the Pyrolysis and Oxidative Pyrolysis of Methyl Chloride," Ind. Eng. Chem. Res. 34, pp. 1842–1852 (1995).
Dr. Terry Galloway and Stephen Depetris, "On–Site Bio–Hazardous Waste Destruction With the Synthetica Steam Detoxifier—Test Organism Kill & Chlorocarbon Destruction," Synthetica Technologies, pp. 1–23.

*Primary Examiner*—Nina Bhat

[57] ABSTRACT

The method and apparatus of the invention converts harmful heteroatoms such as halogens, nitrogen, sulfur and phosphorous in a heteroatom-substituted organic feed stream to less harmful materials by reacting with a reactive gas, such as steam, adjacent a reactive material which has been coated on a porous membrane. The reaction produces secondary products such as acid gases and/or that are neutralized or otherwise rendered innocuous by a reaction with the reactive material which coats the porous membrane. The solid products from the reaction are deposited onto the coating and can be periodically removed by means known in the industry. A gaseous effluent rendered substantially harmless passes through the porous membrane and is either vented or sent for further treatment by conventional means.

23 Claims, 6 Drawing Sheets

METHOD AND SYSTEM FOR REMOVAL OF HARMFUL HETEROATOMS IN GASEOUS WASTE STREAMS

This invention relates generally to the system for converting harmful heteroatoms in gaseous heteroatom-substituted organic feed streams to less harmful materials. More particularly, the invention relates to an improved system and method for reacting such feed streams with a gas which is reactive to such heteroatoms to form less harmful gases which are further reacted to materials which can be disposed by conventional means.

BACKGROUND OF THE INVENTION

There is a pressing need for new systems for the destruction of organic hazardous waste containing toxic components. Such toxic components contain very harmful heteroatoms of halogens, nitrogen, phosphorous, sulfur and metals. The toxic components are found in typical hazardous wastes including all Freons, chlorinated solvents, i.e. those used in dry cleaning; halogen-based plastics, i.e. polyvinyl chloride (PVC) and the like; PCB-dielectric oils for transformers and capacitors; chemical and biological warfare agents; and all pesticides, herbicides, fumacides, bactericides, fungitides, and similar "cides".

Hazardous wastes are very difficult to dispose in landfills because they are biologically stable and tend to leach into the ground water. The use of incinerators for burning hazardous waste is becoming an environmentally unacceptable option for entities faced with its destruction. The destruction of hazardous wastes by incineration is very expensive because of the formation of toxic and corrosive acid gases which attack common refractory, mortars and common alloys and other metals used in incinerators. Incinerators that meet current air pollution laws and can be efficiently operated tend to be relatively large. As a consequence, such incinerators may not be economically feasible for placement at facilities where toxic waste is generated. Moreover, incinerators are often difficult to control and create strong community and political ill-feeling. Perhaps more importantly, however, the incineration process may produce other toxic products which are themselves undesirable and which are difficult or impossible to eliminate.

In U.S. Pat. No. 4,874,587, issued Aug. 26, 1987 and assigned to the assignee of the present invention, a process and apparatus are described for hazardous waste detoxification which represent a significant improvement over incinerators. In the aforesaid patent, a reactor is described in which toxic destruction levels of 99.99% or more are achieved. The aforesaid process and apparatus are operated without air or free oxygen reaction and produce an effluent gas which is primarily comprised of carbon dioxide, hydrogen, carbon monoxide and water. The process and apparatus described in the aforesaid patent has been classified by the United States Environmental Protection Agency as "infrared heater" as differentiated from "incineration". Federal Register No. 57, Aug. 25, 1992, pp. 38558–38564, EPA memorandum Sep. 30, 1991 from Sylvia Lowrence, Dir., Solid Waste to Allyn M Davis, Dir., Region 6.

A steam-reforming detoxification reactor operates to react a gaseous stream of toxic material with water in excess of the stoichiometric amount necessary to react with substantially all of the organic compounds in the stream of toxic waste. This reaction is carried out at a temperature in excess of about 1000° C. (1832° F.) and results in an effluent gas stream of high temperature comprised primarily of carbon dioxide, water, and hydrogen but also containing low levels of carbon monoxide. The latter can be readily converted later to carbon dioxide by catalytic oxidation.

Since the principal reaction in a steam-reforming detoxification reactor occurs in the gas phase, the processing of waste where the waste material can be relatively easily gasified is fairly straightforward. For example, a system for vaporizing and gasifying toxic waste for feeding to a steam-reforming detoxification reactor wherein the toxic waste is liquid contained in a metal drum is shown and described in U.S. Pat. No. 4,863,702, issued on Sep. 5, 1989 and assigned to the assignee of the present invention.

The use of steam-reforming systems for dehalogenation presents special problems since the basic chemistry involved is not well known. The present state of steam-dehalogenation chemistry can be illustrated by the pyrolysis and oxidative pyrolysis of methyl chloride in steam; see R. Yildirim and S. M. Senkan, "Pyrolysis and Oxidative Pyrolysis of Methyl Chloride in Steam", Ind. Eng. Chem. Res. 32, pages 438–444 (1993). The authors conclude that incineration in the presence of steam plus small quantities of oxygen are beneficial to eliminate soot and tars that are common in the pyrolysis of chlorinated hydrocarbons. The steam inhibits the formation of coke to a greater extent than in pyrolysis with the use of inert gas carriers such as argon and nitrogen; see A. Granada, S. M. Karra, S. M. Senkan, "Conversion of $CH_4$ into $C_2H_2$ and $C_2H_4$ by the Chlorine-Catalyzed Oxidative Pyrolysis (CCOP) Process", Ind. Eng. Chem. Res. 26, page 1901 (1987) and S. M. Senkan, R. Yildirim, D. Palke, G. E. Lewis, "Conversion of Methane to Ethylene and Acetylene by Chlorine-Catalyzed Oxidative Pyrolysis Process", in *Novel Production Methods for Ethylene, Light Hydrocarbons and Aromatics* by L. F. Albright, B. L. Crynes, B. L. Nowak, and S. Eds, published by Marcel Dekker, New York, N.Y. (1992). The formation of such particulate matter as coke acts as a precursor or catalyst for the further formation of soot particles and eventually leads to the formation of tars and other harmful deposits. The use of incinerators forms halogen-containing dioxins (one of the most toxic compounds) and dibenzofurans in the post-combustion regions of the equipment where soot and particulate matter exist in excess. The formation of these two harmful heteroatom-substituted organic compounds occur together and the presence of one compound enhances the formation of the other compound. It is the condensation of the heavy polyaromatic hydrocarbons on these soot particles that create the environmental and human health hazardous conditions because these dioxin-laden particles are fine enough to be respirable and ingestible by humans and animals and also to fall onto edible surface crops. The latter is a problem common to dioxin, combustion formed soot, and halogens.

From a review of the published literature on the subject, only steam-pyrolysis removal of single-bonded chlorine is covered. The steam-reforming detoxifier disclosed and claimed in U.S. Pat. No. 4,874,587 handles multiple chlorinated and fluorinated hydrocarbons and chlorinated aromatics. Such complex molecules are dehalogenated in several steps, depending on the halogen-carbon bond energies. Even in the case of the relatively simple multiple halogenated aromatics such as dichlorobenzene, the first chlorine is removed easier than the second chlorine. This is probably due to the increase in the population of $\pi$-orbitals around and strengthening of the last chlorine bonded to the ring. The treatment of such poly-halogenated organic materials requires high temperatures, i.e. 600°–13000° C., and requires long residence times to fully accomplish the complete destruction of the halogenated organic wastes (halocarbons).

Since the formation of the very problematic dioxins and dibenzofurans in incinerators leads to the formation of soot, halogen precursors, free-radicals, and the condensation phenomena, it is critical to remove the one essential element, the halogen, very early in the destruction process. In a steam-reforming detoxifier, no dioxins or debenzofurans are formed because of the absence of oxygen and flame-fronts. However in such a reactor, other aromatics, such as benzene, ethylbenzene, and the like, and polyaromatic hydrocarbons, such as naphthalene, pyrenes and the like are formed together with partially halogenated species. These aromatic compounds can lead to soot formation and particulate matter. Therefore, even in a steam-reforming process, the early removal of the halogen greatly improves the situation.

SUMMARY OF THE INVENTION

In view of the foregoing mechanisms, it would be very desirable to have a system in which harmful heteroatoms such as halogens, nitrogen, sulfur and phosphorous can be converted to less harmful or innocuous gaseous compounds at the same time as the secondary particulate products of sulfur, phosphorous compounds, and metal oxides formed during the reaction are reacted and removed.

The method and apparatus of the invention converts harmful heteroatoms in a heteroatom-substituted organic feed stream to less harmful materials in the presence of a reactive gas. The critical element of the system is at least one porous membrane having a surface coated with a layer of material capable of reacting with a secondary product, i.e., gases, particulates or mixtures thereof, that are formed from the reaction between the reactive gas and the heteroatoms of the feed stream.

A suitable coated membrane for use in the system of the present invention comprises a metallic filter having a coating of an alkali capable of withstanding temperatures in the range of about 600° to about 1300° F. Examples of suitable alkali materials for use in the present invention include sodium carbonate, calcium carbonate, sodium hydroxide, calcium hydroxide. Common pre-coat materials such as lime or sodium bicarbonate are not as effective because they decompose in this temperature range, become hygroscopic and sticky in the presence of steam and convert to carbonates which will decompose at temperatures in the 600° to 1300° F. range. Accordingly, the preferred alkali materials to coat the filters of the present invention include sodium or calcium carbonate.

The porous membranes are continually being coated during the operation of the system of this invention by passing the alkali materials in powdered form via the feed gas or the reactive gas using the filter pre-coating procedures well known in the filter industry.

The heteroatom-substituted organic feed stream enters the system through a suitable inlet tube and is directed toward the coated surface of the porous membrane. A heating means for the system is carefully designed so that it does not heat the feed stream to reaction temperatures until the feed stream is at least adjacent to the coated surface. The phrase "at least adjacent" to includes when the feed stream is proximate the coated surface or substantially at the coated surface or within the coated surface itself. The reactive gas stream enters the system through another suitable inlet tube and is also directed toward the coated surface of the filter.

It is critical to the method and system of the present invention to have the reactive gas stream enter the reactor system upstream from the entry of the feed stream. The heating means should produce radiant heating, either inductively or resistantly, so that the reaction temperatures are achieved "at least adjacent" to the coated surface of the porous membrane. The heating means can be one or more heating coils strategically positioned with respect to the entry of the feed stream. In addition to the heating coils or in place of the heating coils, heating means can be operably connected to the porous membrane to inductively or resistively heat the coating of reactive material to reaction temperatures. The feed stream inlet tube within the reactor should be sufficiently insulated or otherwise shielded from the source of radiant heat to prevent the feed stream from reaching reaction temperature prior to being "at least adjacent" to the coated surface. Secondary products are formed the instant the heteroatoms in the feed stream meet the reactive gas stream after having reached the necessary reaction temperatures "at least adjacent" to the coated surface. These secondary products consist of gases, particulates and mixtures of gases and liquid and solid particulates. A reaction almost simultaneously takes place between these secondary products and the coating of reactive material on the porous membrane.

It is also critical to the method of the present invention that the reaction of the reactive gas with the heteroatoms of the feed on the one hand occur substantially simultaneously with the reaction of the resulting secondary products with the coating of reactive material on the porous membrane on the other hand. As a result of the near simultaneous reactions, the secondary products are not present long enough to have an effect on the environment of the system. These secondary products generally include acidic gases which are very corrosive to materials used in the construction of the reaction containment vessel, the inlet tubes, the heating elements and most importantly, the metals or alloys used in the construction of the porous membrane.

The major products from the reaction of the secondary products and the reactive coating consist of a benign solid deposited on the coating and either benign gases or much less harmful gases which can be further treated using conventional gas treatment systems. The solid deposits are periodically removed from the porous membranes by conventional pulsing means involving reverse flow of air, steam or other gas which is set forth in greater detail below.

DESCRIPTION OF THE DRAWINGS

Advantages of the present invention will become apparent to those skilled in the art from the following description and accompanying drawings in which.

DETAILED DESCRIPTION OF THE INVENTION

Figure 1:
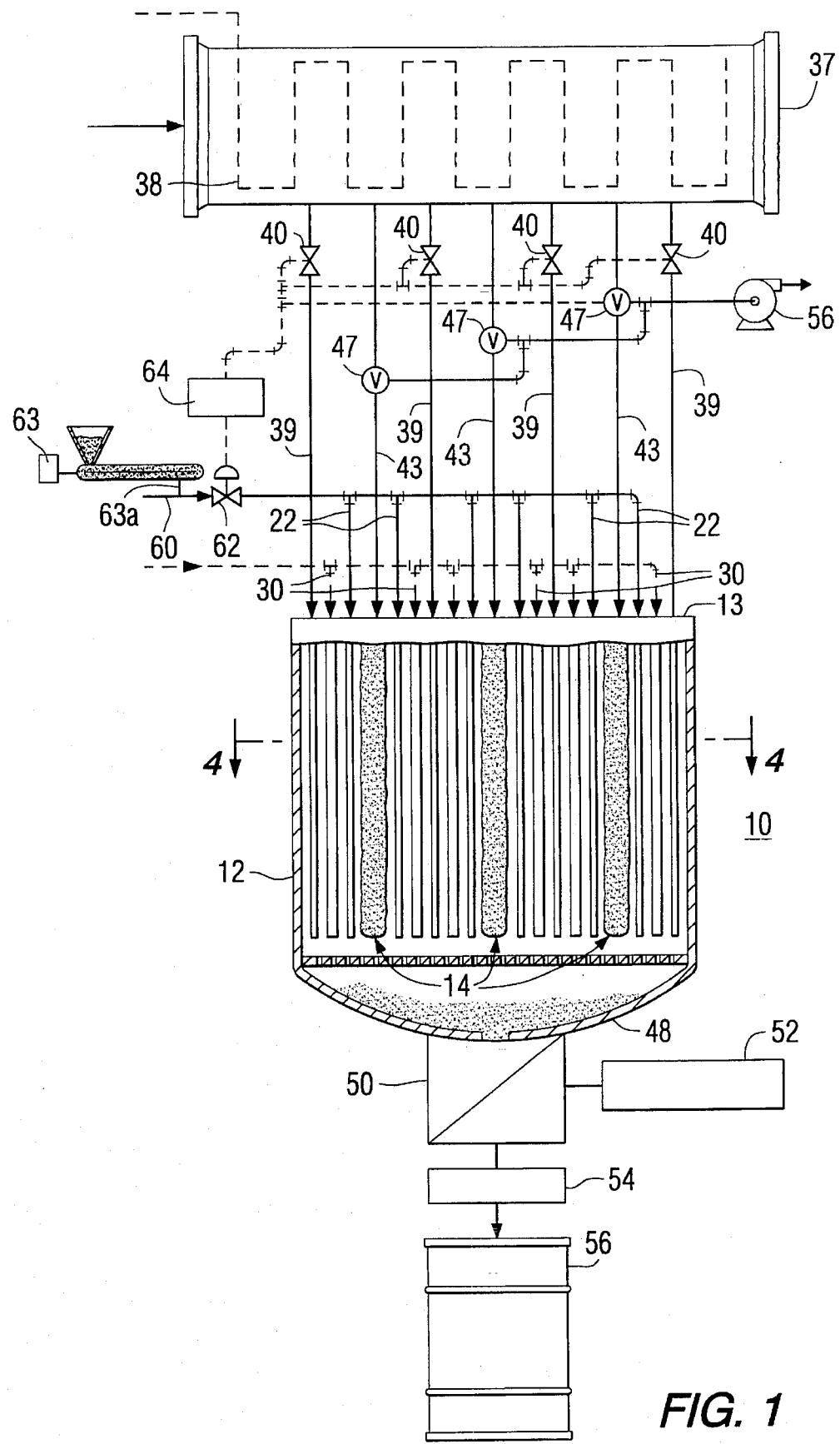
FIG. 1 is a schematic view, partially in cross-section, of a system constructed in accordance with one embodiment for carrying out the method of the present invention.
Figure 2:
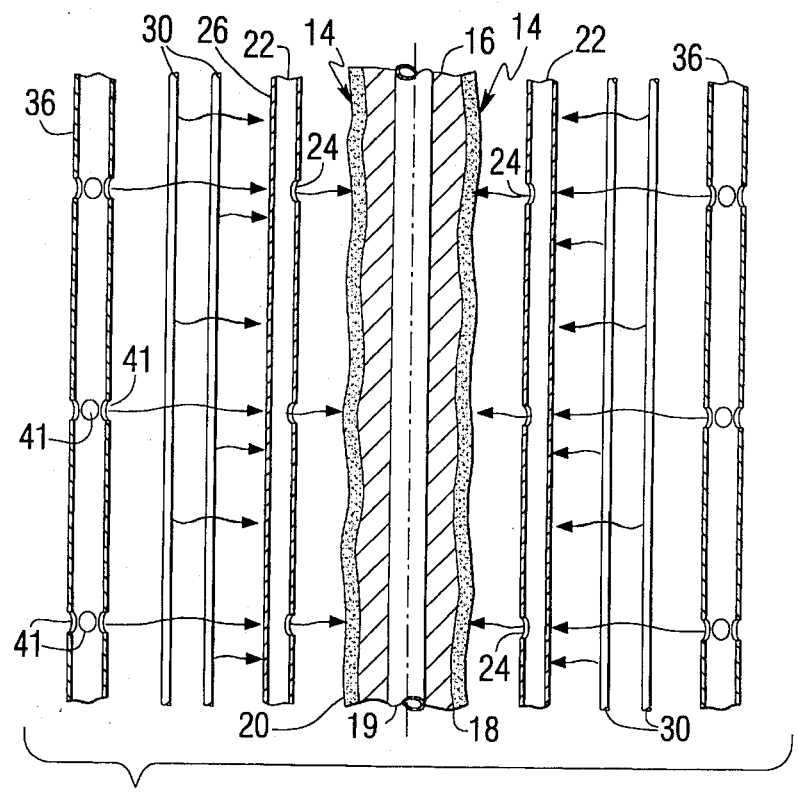
FIG. 2 is a detailed view, partially in cross-section, of a portion of the internals shown in FIG. 3 along curved line 2—2.

FIGS. 1–4 illustrate a preferred embodiment of the method and system of the present invention in which reaction vessel 10 represents one of many types of vessels that can be used. Vessel 10 has cylindrical wall 12, insulated with a layer of insulation not shown, and top plate 13. Mounted within vessel 10 are a plurality of filters 14. Each filter 14 comprises tube or candle 16 attached to top plate 13 and having closed end 17. Tube 16 is composed of a porous metal alloy capable of withstanding reaction temperatures and its outer surface 18 is initially coated with layer 20 of a reactive material. Tube 16 preferably comprises a metal alloy with graded porosity ranging from a fine mesh on outer surface 18 to a coarse mesh on inside surface 19. A plurality of inlet tubes 22 for waste feed streams are attached to top plate 13 and positioned within vessel 10 adjacent to filters 14 as shown. A plurality of outlet nozzles 24 on each inlet tube 22 direct the flow of the waste feed stream to the outer surfaces of layers 20. Each of inlet tubes 22 contains insulation layer 26. Alternatively layer 26 can be replaced by heat shield 26. Radiant heating elements 30 entering top plate 13 are mounted proximate to each inlet tube 22 and distal to each quadrant of each filter 14.

Figure 4:
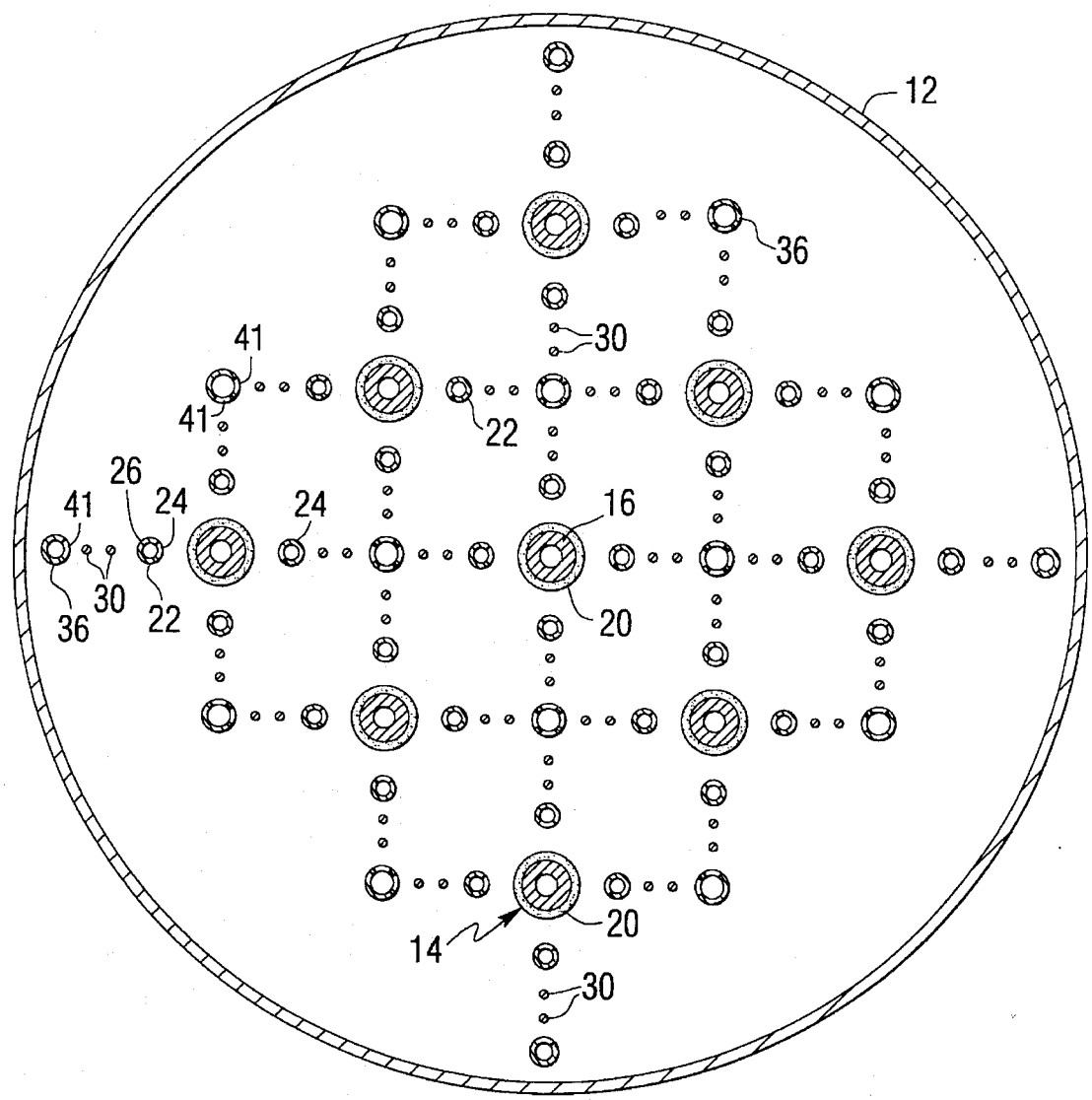
FIG. 4 is a cross-sectional view of the reactor of the present invention taken along sectional plane 4—4 of FIG. 1.

Accordingly, in the arrangement of internals shown in FIG. 4, four heating elements 30 are positioned distal to each of the nine filters 14. Thirty six reaction gas inlets tubes 36 are mounted proximate each of the 36 heating elements 30 and distal to each filter 14. The reactive gas is superheated in heater 37 by means of heating coils 38 and passes through lines 39 and valves 40 to inlet tubes 36. Each of the reaction gas inlet tubes 36 have a plurality of nozzles 41 directing the flow of the reactive gas past heating elements 30 and feed inlet tubes 22 toward filter 14.

The reactive gas can be any gas which is capable of reacting with the heteroatoms in the feed stream, but this gas is not reactive with the reactive material which coats the filters. Examples of such reactive gases include steam, hydrogen, nitrogen, methane and ethane. The typical heteroatoms found in waste streams, in general, include chlorides, bromides, iodides, fluorides, sulfides, phosphides and nitrides. Upon reaction with the reactive gas, the heteroatoms are converted to secondary products of an acid gas and/or liquid and solid particulates. The acidic gases include HCl, HBr, HI, HF, COS, $H_2S$, $NO_x$, $SO_x$, $PO_x$ and similar compounds. The liquid and solid particulates include $P_4O_6$, $P_2O_3$, $S_2$, and oxides of metals from Group III, IV, V, VI, VII and VIII of the Periodic Table, including the rare earths.

Vacuum pump 56 imparts a vacuum on filters 14 and draws the water vapor, carbon dioxide and less harmful reaction product gases through lines 43 either to downstream processing by conventional means, if necessary, or to the atmosphere.

A build-up of solid reaction products occurs at least on layer 20 from the reaction of the reactive gas, the reactive coating material of layer 20 and the heteroatoms in the feed gas stream. The solid reaction products can be deposited on the outer surface of layer 20 or within layer 20. This build-up must be periodically removed by means well known in the industry. For example, superheated steam under pressure from heater 37 is pulsed though two-way valves 47, lines 43 into each filter 14 causing the solid reaction products built up either on or within layer 20 to slough off and fall into bottom 48 of vessel 10. The solids fall by gravity into valve lock hopper 50 which is operated by actuator 52 and loaded into temporary storage 54. The solids can be loaded into residue drum 56 for disposal by conventional means. Alternatively, air or an inert gas can be used in place of steam to remove the build-up of solids on layer 20. The gas used to pulse filters 14 for solids removal must be substantially at the same temperature for the reaction to prevent loss of cycle time and possible damage to the reactor internals.

Each of the nine banks of filters 14 shown in FIG. 4 consist of inlet line 60 controlled by valve 62 and connected to feed inlet tubes 22, four feed outlet nozzles 24, outlet line 43 controlled by valve 47, four heating coils 30, and four reactive gas lines 39 controlled by valve 40 and connected to four reactive gas outlet nozzles 41. A typical steam reforming operation consists of initially passing the reactive gas, e.g. steam, at a temperature in the range of 1000° to 1100° F. though lines 36, outlet nozzles 41, filters 14, lines 43, valves 47 of all nine banks of filters and pump 56 to equilibrate the system. Feed gas is then introduced through line 60, valve 62 and into each of feed inlet tubes 22. The feed stream flows out of outlet nozzles 24 to react with the reactive gas which continues to flow though filters 14, as discussed above. The reactive coating is continuously renewed on filters 14 by feeding powdered reactive material via powdered doser 63 through line 63a to feed line 60.

Sequentially, in one of the banks (bank one) of the nine banks of filters 14, valve 62 is shut in response to controller 64 which momentarily interrupts the flow of feed to tube 22. Controller 64 also closes valve 40 in bank one and momentarily interrupts the flow of reactive gases passing though lines 39. Valve 47 in bank one interrupts the flow of effluent through line 43 and directs reactive gas from heater 37 to reverse the direction of the gas remaining in line 43 and to enter filter 14 of bank one. This reverse flow of gases passes through porous wall 16, layer 20 and out through the build-up of solid reaction products causing these products as well as the solid reactive coating remaining on filter 14 to fall by gravity into bottom 48. The method of the present invention is considered to be operating continuously since only one bank in each reactor vessel 10 is undergoing a solids removal at any moment in time.

Figure 6:
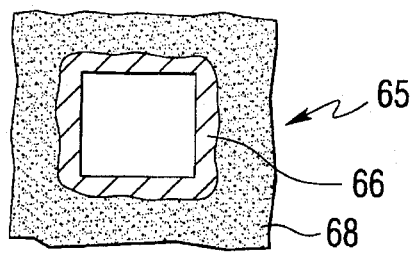
FIG. 6 is a cross-sectional view of another embodiment of a porous membrane of the present invention.

It is apparent that filters 14 can be of any cross-section from square, rectangular, hexagonal to circular. FIG. 6 shows a cross-section of a square filter 65 have wall 66 of a porous metal and layer 68 of a reactive material.

Figure 5:
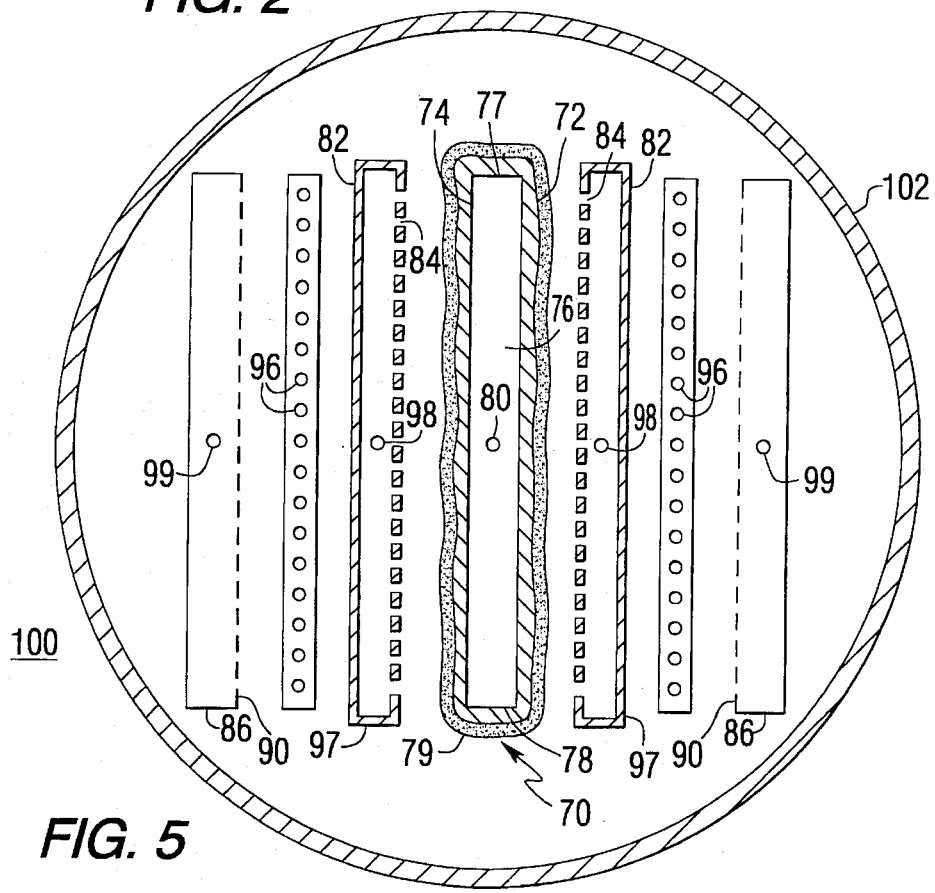
FIG. 5 is a cross-sectional view of a reactor representing another embodiment of the present invention taken along a plane of such a reactor that is similar to cross-sectional plane 4—4 shown in FIG. 4.
Figure 3:
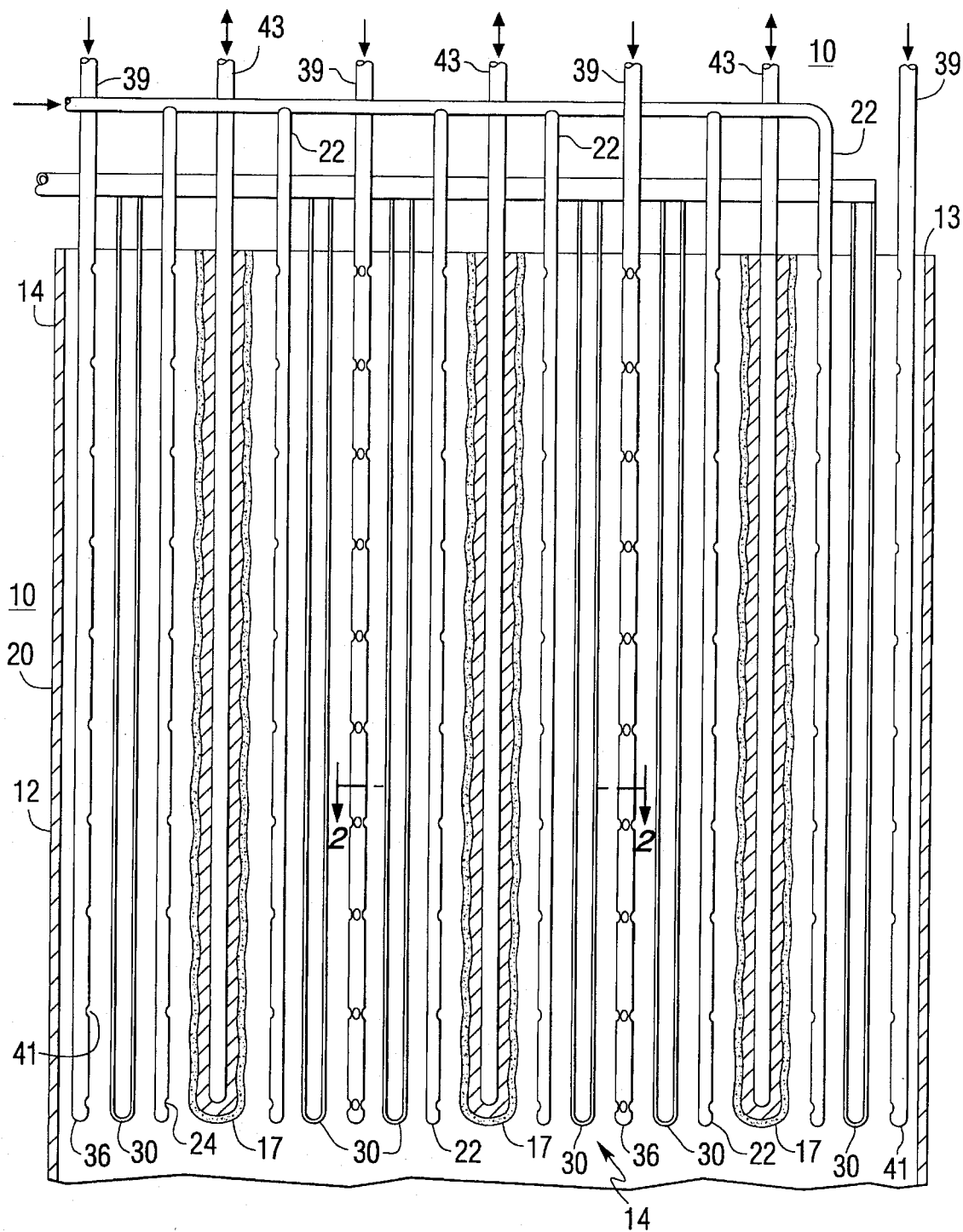
FIG. 3 is a more detailed view, partially in cross-section, of the internals positioned along the centerline of the reactor of the embodiment of the present invention shown in FIG. 1.

FIG. 5 illustrates an embodiment of the present invention in which a plurality of tubular filters 14 are replaced by dual porous plate 70 having first outer face 72, second outer face 74, top 76 and bottom (not shown). First and second outer faces 72 and 74 are joined by first and second sides 77 and 78 to form rectangular hollow box. The outer surface of the first and second sides and first and second outer faces are coated with layer 79 with a reactive material. Line 80 connects top 76 to the same vacuum system as shown in FIG. 1 for removing the water vapor, carbon dioxide and the less harmful reaction product gases during the operation of the system. Feed gas inlet plenum chambers 82 are located opposite first and second outer faces 72 and 74. Outlet nozzles 84 allow an even distribution of the feed stream to flow toward coated faces 72 and 74. Reactive gas plenum chambers 86 are located adjacent to each of feed plenum chambers 82 for injecting the reactive gas through nozzles 90. Radiant heating elements 96 are mounted between each of feed plenum chambers 82 and reactive gas plenum chambers 86. Feed plenum chamber 82 is insulated by insulation layer 97 to prevent the feed stream from reaching reaction temperatures prior to the feed stream passing at least within the vicinity of the coating on porous plates 72 and 74. Feed passes through lines 98 to feed plenum chamber 82 and reactive gas passes through lines 99 to reactive gas plenum chamber 86. Lines 98 and 99 are controlled in the same manner as set forth above in a description of FIGS. 1–4. The internals described above are mounted within reactor 100 insulated with layer 102.

Reactor 100 has the same type of system for periodically pulsing off the reactive coating and the solid secondary product build-up deposited on or in the reactive coating. It is apparent to those skilled in the art that reactor 100 can contain a number of banks of porous membrane plates so long as they are each critically positioned relative to the reactive gas and feed stream plenum chambers as described above in connection with the porous tubes or candles. In the case of a plurality of banks of plates, the solids build-up on the filters is periodically removed sequentially—one bank of plates to the next bank of plates.

Figure 7:
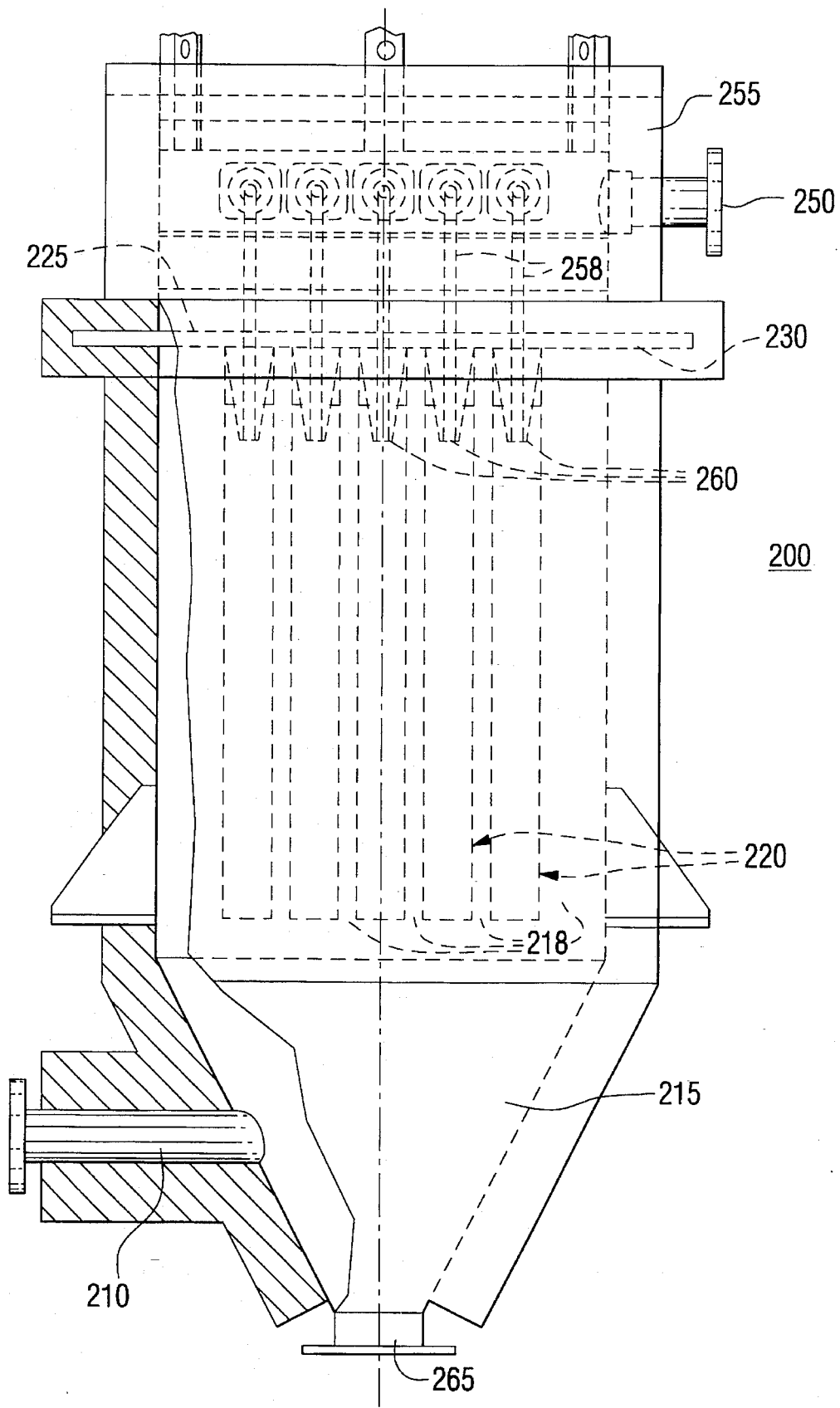
FIG. 7 is a elevation view, partially in cross-section, of a prior art filter vessel using prior art porous metal filter candles.
Figure 8:
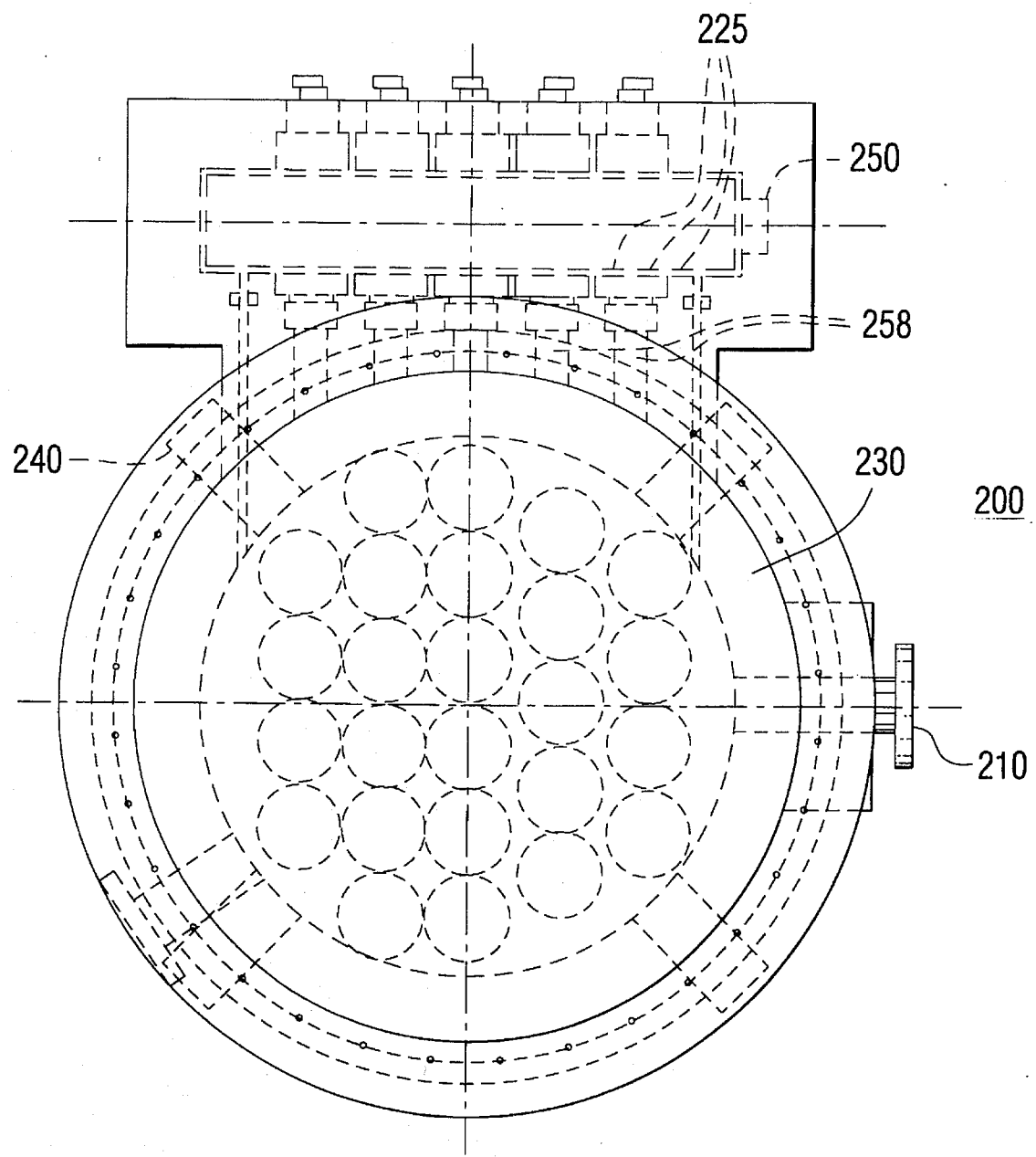
FIG. 8 is a top plan view of a prior art filter vessel shown in FIG. 7.

The exact number of filters 14 to be mounted from upper plate 13 of reactor 10 depend on the diameter of the reactor. A typical reactor used in the destruction of toxic waste has a width ranging from about 4 to about 6 feet and has a height ranging from about 7 to about 10 feet. A typical commercially available filter has a diameter of 3.5 inches, has a length ranging from 41 inches to 117 inches and is constructed of Inconel® alloy capable of withstanding temperatures up to about 1300° F. Such filters called candles are available from Memtec America Corporation and are supplied by Fisher-Klosterman. A typical prior art filter vessel has a diameter of about 4 feet and uses 25 of such prior art candles arranged as shown in FIGS. 7 and 8. With reference to FIGS. 7 and 8, a typical prior art filtering operation using these typical prior art filter candles is described below.

DESCRIPTION OF A TYPICAL PRIOR ART FILTERING OPERATION

A gas stream containing fine particulates or dust, which are to be removed from the gas stream, enters conical vessel 200, having a diameter of about 4 feet and a height of about 7 feet, through inlet 210 in conical section 215 of vessel 200 and passes upwardly through the exterior region 218 of candles 220. The candles are mounted on plate 225 at the top of vessel 200. The gases pass through the porous walls of filter candles 220 where a pressure drop of approximately 5 inches of water is maintained. The gas that has now been cleaned of dust exits at the top of vessel 200 through gas exit manifold 230 and leaves reactor 200 through outlet 240. The dust builds up on the exterior surface of candles 220. In actual practice, filter candles 220 are coated with dust during a five minute period of the filtering cycle of the operation and then are pulsed for a period of a few seconds with a pulsing gas such as steam or air to remove the dust. The pulsing gas is passed via inlet 250 into manifold 255, out of manifold 255 through lines 258 and into exit gas manifold 230. The pulsing gas enters each of candles 220 through jet nozzles 260. This reverse flow of steam or air removes the dust coating from the exterior surface of each candle 220. The dust falls downward into conical section 215 and out through solids outlet 265. The solid particulate material is placed in containers for disposal off site. This pulse cleaning operation is applied to groups of candles, typically 4 to 6 in number, in such a manner that only a portion of the total number of filter candles in the vessel are cleaned at any period of time. Therefore, the filter vessel is permitted to be operated continuously. The pulse cleaning operation proceeds from one group to the next group of filter candles about every minute during the dust removal cycle of the filter vessel operation.

The example below illustrates one embodiment of practicing the method of the present invention. This example is for illustrative purposes only and is not meant to limit the scope of the claims in any way.

EXAMPLE 1: DESTRUCTION OF CHLORINATED SOLVENTS

A gaseous waste feed stream containing trichloroethylene passes through lines 60 and valve 62 into reactor 10 via insulated inlet tube 22 adjacent filter 14 coated with layer 20 of sodium carbonate. Radiant heat from heating element 30 radiates past inlet tube 22 insulated to prevent the feed stream from reaching reactive temperatures of about 600° to about 1300° F. Steam passing through outlet nozzles 41 of reactive gas inlet 36 is directed past heating element 30 and feed tube 22 to come into contact with the trichloroethylene adjacent to or on the sodium carbonate coated surface 18 of filter 14. Pre-coated filter 14 functions by initially having superheated stem pass through layer 20 and through the porous wall. The flow of the halocarbon-containing feed stream is injected into this flow of steam, which is present in excess of the stoichiometric ratio of steam to the halocarbons in the feed. The feed is injected adjacent the outer surface of the sodium carbonate layer 20 as the steam continues to flow through filter 14. The mechanism for the destruction of the harmful halocarbon in the feed is a high temperature steam-dehalogenation reaction in which the halogen is removed from the organic base and reacts with the hydroxyl (.OH) to form halogen acid gases, e.g. HCl, which are carried along with the steam onto the hot outer surface of layer 20. Once the acidic gases come into contact with the sodium carbonate, the sodium salt of the halogen is formed and is deposited onto the outer surface of layer 20 with the release of $H_2O$ and $CO_2$. These harmless gases are removed along with the steam that continues to pass through filter 20.

In this example, the following reactions take place:

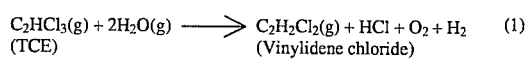

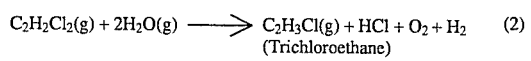

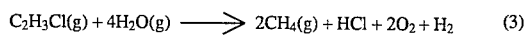

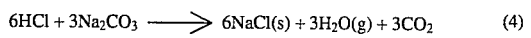

When summed, the above reactions yield:

Reactions (1) through (4) reach a conversion of approximately 95% to result in salt which coats layer 20 and a gaseous mixture which passes through filter 14. This gaseous mixture contains an insignificant amount of HCl which is below the threshold for corrosion of the Inconel alloy used in filter 14.

EXAMPLE 2: DESTRUCTION OF CHEMICAL WEAPONS

When used to destroy chemical warfare agents, the system and method of the invention consists of evaporating the agent which is steam-reformed in the presence of superheated steam to release acid gases, e.g., HF, $H_3PO_3$, which immediately contact the neutralizing material coating the filter, and finally the remaining organic fragments are further destroyed by the continued steam-reforming taking place within vessel 10 being conducted at high temperature ($\approx 1300°$ F). Within the vessel of the present invention, the warfare agent is vaporized by the combination of the radiant heat and the superheated steam. The steam-reforming of warfare agent forms CO, $CO_2$, $H_2O$, $H_2$, HF, $H_3PO_3$ and a small amount of $CH_4$. After neutralization of the acid gases by the alkali to form harmless salts that build-up on the surface of the filter, the remaining gases are heated to higher temperatures and mixed with excess superheated steam where any remaining organic fragments are nearly completely destroyed.

Unlike incineration, the chemistry used in the system of the invention does not involve combustion. The main chemical reactions, here illustrated for di-isopropyl fluorophosphate, can be considered to be reduction by steam:

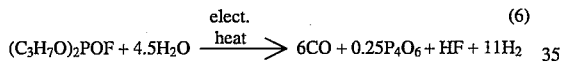

$$(C_3H_7O)_2POF + 4.5H_2O \xrightarrow{\text{elect. heat}} 6CO + 0.25P_4O_6 + HF + 11H_2 \quad (6)$$

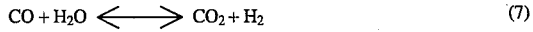

$$CO + H_2O \rightleftharpoons CO_2 + H_2 \quad (7)$$

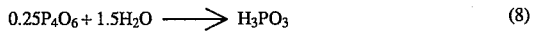

$$0.25P_4O_6 + 1.5H_2O \longrightarrow H_3PO_3 \quad (8)$$

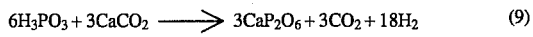

$$6H_3PO_3 + 3CaCO_2 \longrightarrow 3CaP_2O_6 + 3CO_2 + 18H_2 \quad (9)$$

A small portion of the CO, $CO_2$, $H_2O$, and $H_2$ gases formed in the reactor 10 can be split off the main flow and fed to a catalytic CO converter (not shown). In such a CO converter, excess air is added to convert these gases to $CO_2$ and $H_2O$, as per the following reactions:

$$2CO + O_2 \longrightarrow 2CO_2 + HEAT \quad (10)$$

$$2H_2 + O_2 \longrightarrow 2H_2O + HEAT \quad (11)$$

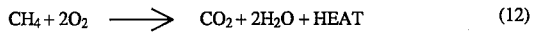

$$CH_4 + 2O_2 \longrightarrow CO_2 + 2H_2O + HEAT \quad (12)$$

The heat of reaction released in the CO converter is recovered and reused in the steam-reforming process. The CO converter catalyst also destroys any residual traces of reactants or by-products left in the effluents passing through filter 14.

Further, without departing from the spirit and scope of this invention, one of ordinary skill in the art can make many other changes and modifications to the system and methods of the present invention to adapt it to specific usages and conditions. As such, these changes and modifications are properly, equitably, and intended to be, within the full range of equivalents of the following claims.

What is claimed is:

1. A system for converting harmful heteroatoms in a gaseous heteroatom-substituted organic feed stream to less harmful materials, the system which comprises:

(a) a housing having inner and outer walls;

(b) at least one porous membrane within said housing having a surface coated with a layer of a reactive material;

(c) at least one feed inlet means within said housing for directing a gaseous heteroatom-substituted organic feed stream toward the coated surface of said porous membrane;

(d) heating means positioned between the inner wall of said housing and said feed inlet means for heating the feed stream to reaction temperatures in the range of about 600° to about 1300° F. during the time the feed stream is at least adjacent to the coated surface of said porous membrane;

(e) at least one reactive gas inlet means positioned upstream from said feed inlet means so that said feed inlet means is between said reactive gas inlet means and said porous membrane for directing a reactive gas stream capable of reacting with harmful heteroatoms in the feed stream when the reactive gas is at least adjacent to the coated surface, whereby the harmful heteroatoms in the feed stream are removed by reaction with the reactive gas stream to form secondary products selected from the group consisting of gases, particulates and mixtures thereof substantially simultaneously to the reaction of the resulting secondary products with the reactive material coated on said membrane before the secondary products can corrosively attack the system; and (f) at least one outlet for removing the less harmful gaseous products formed from the reaction between the heteroatoms, the reactive gas and the reactive material on or within the coated surface.

2. The system of claim 1 wherein said heating means is a radiant heater.

3. The system of claim 2 wherein said radiant heater includes a shield means for shielding the radiant heat from said heater until after the feed stream has exited from said feed inlet means and is at least adjacent the coated surface of said porous membrane.

4. The system of claim 2 wherein said heating means is operably connected to said porous membrane to inductively or resistively heat the coating of reactive material to steam-reforming decomposition temperatures.

5. The system of claim 1 wherein said feed inlet means includes an insulator means for insulating the feed stream exiting said feed inlet means from reaching reaction temperatures until after the feed stream is at least adjacent the coated surface of said porous membrane.

6. The system of claim 1 wherein said feed inlet means and said reactive gas inlet means direct the respective gaseous streams so the harmful heteroatoms in the feed stream are removed by reaction with the reactive gas to form acidic gases nearly simultaneously to the reaction of the resulting acidic gases with the reactive material and before the acidic gases can corrosively attack the system.

7. The system of claim 6 wherein a solids removal means is provided for periodically removing solid reaction products that build up on the coated surface of said porous membrane during the reaction between the heteroatoms, the reactive gas and the reactive material on the coated surface.

8. The system of claim 7 wherein a pressure drop means is provided by maintaining a proper gas flow through the coated surface to an uncoated surface of said porous membrane to establish a pressure drop sufficient to hold the build-up of solid reaction products onto the porous membrane during the conversion of heteroatoms.

9. The system of claim 8 wherein said pressure drop means is a means for drawing a vacuum on the uncoated surface of said membrane.

10. The system of claim 8 wherein said solids removal means is a means for periodically created a pulse of gas directed from the uncoated surface through the coated surface sufficient to dislodge the solids build-up of reaction products and the remaining reactive material and means for continually renewing the coating of reactive material on said porous membrane.

11. The system of claim 1 wherein said porous membrane is a plate positioned vertically within said housing.

12. The system of claim 1 wherein said porous membrane is a hollow robe positioned vertically within said housing in which its outer surface is coated with the layer of reactive material.

13. A system for converting harmful heteroatoms in a gaseous heteroatom-substituted organic feed stream to less harmful materials in the presence of steam, the system which comprises:

(a) a housing having inner and outer walls;

(b) at least one porous membrane within said housing having a surface coated with a layer of a reactive material and an uncoated surface;

(c) at least one steam inlet means for directing steam into said housing;

(d) at least one feed inlet means positioned downstream from said steam inlet means and between said steam inlet means and said porous membrane for directing a gaseous heteroatom-substituted organic feed stream toward the coated surface of said porous membrane in relationship to the steam being directed into the housing so the harmful heteroatoms in the feed stream are removed by reaction with the steam to form secondary products selected from the group consisting of gases, particulates and mixtures thereof substantially simultaneously to the reaction of the resulting secondary products with the reactive material before the secondary products can corrosively attack the system;

(e) heating means positioned between the inner wall of said housing and said feed inlet means for heating the feed stream to steam-reforming decomposition temperatures in the range of about 600° to about 1300° F. during the time the feed stream is at least adjacent to the coated surface of said porous membrane; and (f) at least one outlet for removing the less harmful gaseous steam-reforming decomposition products formed from the reaction between the heteroatoms, steam and the reactive material on or within the coated surface.

14. The system of claim 13 wherein said heating means is a radiant heater.

15. The system of claim 13 wherein said radiant heater includes a shield means for shielding the radiant heat from said heater until after the feed stream has exited from said feed inlet means and is at least adjacent the coated surface of said porous membrane.

16. The system of claim 13 wherein said feed inlet means includes an insulator means for insulating the feed stream exiting from said feed inlet means from reaching steam-reforming decomposition temperatures until after the feed stream is at least adjacent the coated surface of said porous membrane.

17. The system of claim 16 wherein a solids removal means is operable engaged with said porous membrane for periodically removing solid reaction products that build up on the coated surface of said porous membrane during the reaction between the feed stream, steam and the reactive material on the coated surface.

18. The system of claim 17 wherein a pressure drop means is provided by maintaining a proper gas flow through the coated surface to the uncoated surface to establish a pressure drop sufficient to hold the build-up of solid reaction products onto the porous membrane during the conversion of heteroatoms.

19. The system of claim 18 wherein a said pressure drop means is a means for drawing a vacuum on the uncoated surface of said porous membrane.

20. The system of claim 19 wherein said solids removal means is a means for periodically created a pulse of gas directed from the uncoated surface through the coated surface sufficient to dislodge the solids build-up of reaction products and the remaining reactive material and means for continually renewing the coating of reactive material on said porous membrane.

21. The system of claim 13 wherein said porous membrane is a plate positioned vertically within said housing.

22. The system of claim 13 wherein said porous membrane is a tube positioned vertically within said housing.

23. The system of claim 13 wherein an external radiant heating means is operably connected to said porous membrane to heat the coating of neutralizing material to steam-reforming decomposition temperatures.

* * * * *